| United States Patent [19] | [11] | 4,364,908 |
|---|---|---|
| Rahm et al. | [45] | Dec. 21, 1982 |

[54] METHOD FOR PURIFYING TITANYL HYDRATE

[75] Inventors: Joseph A. Rahm, Long Branch; Ivan B. Lampe, Oceanport, both of N.J.

[73] Assignee: NL Industries, Inc., New York, N.Y.

[21] Appl. No.: 286,305

[22] Filed: Jul. 24, 1981

[51] Int. Cl.³ ............................................. C01G 23/04
[52] U.S. Cl. ..................................... 423/86; 423/610; 423/615; 106/300
[58] Field of Search .................... 423/86, 610, 615; 106/300

[56] References Cited

U.S. PATENT DOCUMENTS

| 2,148,283 | 2/1939 | Washburn | 106/300 X |
|---|---|---|---|
| 2,476,453 | 8/1947 | Peirce et al. | 106/300 |
| 3,501,271 | 3/1970 | Twist et al. | 106/300 X |
| 3,728,431 | 4/1973 | Kienast et al. | 423/615 X |

FOREIGN PATENT DOCUMENTS

| 642855 | 6/1962 | Canada | 423/615 |
|---|---|---|---|
| 1241963 | 8/1971 | United Kingdom | 423/610 |
| 476300 | 2/1973 | U.S.S.R. | 106/300 |

*Primary Examiner*—G. O. Peters
*Attorney, Agent, or Firm*—Malcolm L. Sutherland; Donald L. Traut

[57] ABSTRACT

A process is provided for removing impurities from a slurry of titanyl hydrate. The titanyl hydrate is separated from the slurry, washed, and reslurried with water to make the resulting titanyl hydrate slurry fluid. The reslurried titanyl hydrate slurry is then treated by the addition of a trivalent titanium compound in an amount between about 0.01 grams and about 0.7 grams trivalent titanium compound measured as $TiO_2$ per 100 grams titanyl hydrate as calcined $TiO_2$ in the absence of additional acid values. The titanyl hydrate is then separated from the treated slurry, washed and recovered.

16 Claims, 1 Drawing Figure

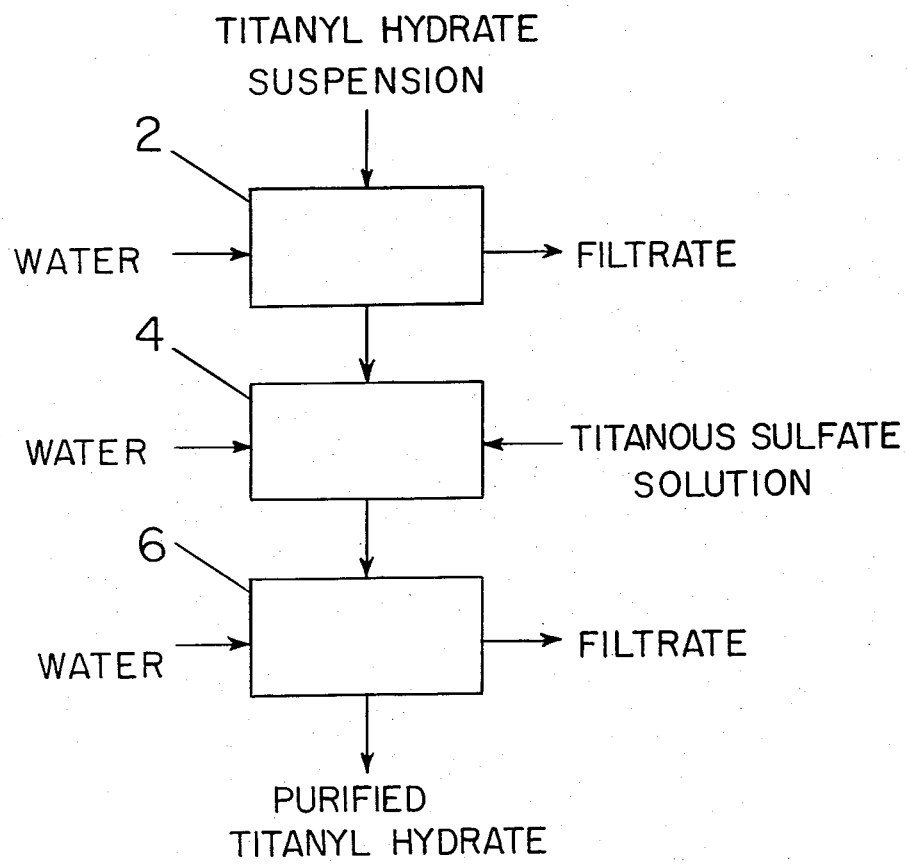

METHOD FOR PURIFYING TITANYL HYDRATE

This invention relates to an improved process for the purification of titanyl hydrate formed during the production of titanium dioxide pigments.

Titanium dioxide pigments have been produced by gaseous chloride, hydrogen chloride, and sulfate processes. In the production of titanium dioxide pigments by the sulfate process, titaniferous bearing materials, such as ilmenite and rutile ores and furnace slag, are digested with various concentrations of sulfuric acid to form a titanyl sulfate and iron sulfate solution. This solution is clarified of insoluble matter and then hydrolyzed to precipitate titanyl hydrate which is further processed to form titanium dioxide. Production of titanium dioxide by the hydrogen chloride process follows substantially the same processing steps except hydrochloric acid is used in place of sulfuric acid.

During the hydrolysis process, the precipitated titanyl hydrate carries with it adsorbed impurities predominently as mineral acid salts of ferric iron, chromium, and vanadium. These impurities cannot be removed even after prolonged and repeated washing operations. These impurities are originally present in the titaniferous bearing materials. For example, a typical analysis of ilmenite ores found in the State of New York is:

| Constituent | Percent |
|---|---|
| $TiO_2$ | 44.4 |
| FeO | 36.7 |
| $Fe_2O_3$ | 4.4 |
| $SiO_2$ | 3.2 |
| $Al_2O_3$ | 0.19 |
| $P_2O_5$ | 0.07 |
| $ZrO_2$ | 0.006 |
| MgO | 0.80 |
| MnO | 0.34 |
| CaO | 1.0 |
| $V_2O_5$ | 0.24 |
| $Cr_2O_3$ | 0.001 |
| $SnO_2$ | 0.001 |
| CuO | 0.004 |
| $CeO_2$ | 0.002 |
| Cb | 0.002 |

In U.S. Pat. No. 2,148,283 which involves a sulfate process, a slurry of hydrous titanium oxide material, after being washed with water, is brought into contact with a water-insoluble reducing agent, such as powdered metallic zinc or aluminum, during the first repulping operation to solubilize impurities. The reducing agent is used in an amount sufficient to maintain reducing conditions throughout the washing and filtration treatment. The amount of reductant employed is dependent upon the amount of ferric iron in contact with the hydrous titanium oxide. The residual free sulfuric acid contained in the repulped hydrate is maintained during washing at a sufficient level that no additional mineral acid is required. This process has several drawbacks. Firstly, the use of a water-insoluble reducing agent, such as zinc or aluminum, can result in the formation of a photosensitive or mixed pigment, i.e., a pigment containing anatase and rutile crystal structures, if the reducing agent is not completely reacted and ultimately removed from the titanyl hydrate following treatment. Additionally, some of the titanium hydrate reacts with the residual free acid and/or reducing agent to form water-soluble titanium values which will be lost in the filtrate during filtration.

U.S. Pat. No. 2,999,011 discloses a method for bleaching titanyl hydrate which comprises dividing the washed titanyl hydrate obtained from the hydrolysis of a titanium and iron sulfate solution into a major and minor portion, solubilizing most of the titanium values in the minor portion to titanous sulfate by digestion with 16% to 40% sulfuric acid in the presence of a reducing agent to produce a bleaching slurry. The bleaching slurry is added to the major portion of the separated titanyl hydrate slurry to form a bleached slurry containing 0.1% to 2% by weight sulfuric acid. The amount of reduced titanium values in the bleaching slurry should be sufficient to reduce the iron in the major portion to a lower valent compound and to solubilize the same while maintaining at least 0.05 grams/liter of trivalent titanium in the bleached slurry. Following bleaching the slurry is filtered and washed to produce a titanyl hydrate substantially free from iron.

The aforementioned process while being used successfully on a commercial basis, has several shortcomings. In the process, the minor portion of titanyl hydrate slurry which is removed must be digested with additional sulfuric acid values. This step not only requires a duplication of the original ore digestion step, but is wasteful of reagents. Additionally, the process requires at least a level of 0.05 grams/liter trivalent titanium be maintained in the final bleach slurry in order to prevent the oxidation of iron in the resulting titanium hydrate slurry to an insoluble higher valent state compound, namely ferrous iron to ferric iron. This level is in excess of the amount needed to remove the impurities and thereby wastes valuable titanium values as trivalent titanium and creates waste disposal problems. Furthermore, the method requires that the bleaching process take place in the presence of a high level of mineral acid. The presence of such acid is counterproductive to the bleaching operation and leads to the use of additional excess trivalent titanium and solublization of titanium as titanyl sulfate, both of which are lost as waste.

Another prior art process for bleaching impure titanyl hydrate is described in French Patent No. 1,422,120. In this process the precipitated titanyl hydrate is filtered on a Moore or rotary filter to form a filter cake, the filter cake is washed with water to eliminate a major part of the residual sulfuric acid and substantially all the water soluble salts. The washed filter cake is then treated by passing an acidic solution containing trivalent titanium through the filter cake, and optionally followed with a water wash.

The French patent has many of the same deficiencies of the earlier prior art, one such being the bleaching in the presence of free sulfuric acid. Additionally however, due to the method of introducing the trivalent titanium values to the titanium hydrate wet cake, i.e., washing the solution through the cake, excessively large quantities of trivalent titanium are necessary to remove the impurities. Furthermore, if the trivalent wash is not carried out carefully, an off-color product results.

U.S. Pat. No. 3,981,978 discloses an improved process over the process in the aforementioned French patent. The improvement comprises pressure filtering the aqueous titanium dioxide hydrate suspension on a membrane filter under a pressure of 3 bars to 16 bars to form a homogeneous substantially crack-free filter cake of a thickness of about 10 to 25 mm. and pressure washing the filter cake under a pressure of 1 bar to 16 bars with water containing 0.8 to 4 g. of $Ti^{+3}$/liter.

This process like the aforementioned French patent requires excessive quantities of trivalent titanium in order to assure adequate removal of the absorbed impurities due to the method of introducing the trivalent titanium onto a filter cake. The care in washing the cake with the trivalent titanium solution is more critical than in the French patent due to compaction of the hydrate cake by pressure filtration. Furthermore, solutions containing titanous sulfate ($Ti^{+3}$) at the levels employed in the process readily oxidize to titanyl sulfate ($Ti^{+4}$) thereby decreasing efficiency, increasing cost, and loss of soluble titanium values to the waste stream.

A process has been unexpectedly discovered which provides a means for removing impurities, mainly iron, from titanyl hydrate and substantially reduces the drawbacks of the prior art processes while avoiding the difficulties associated with conventional techniques.

According to the present invention, there is provided a process for removing impurities from titanyl hydrate comprising:
a. slurrying an impure titanyl hydrate with a sufficient amount of water to prepare a titanyl hydrate slurry containing between about 25% and about 45% by weight titanyl hydrate;
b. Treating the titanyl hydrate slurry to solubilize impurities from the titanyl hydrate by the addition of a trivalent titanium compound in an amount between about 0.01 grams and about 0.7 grams trivalent titanium compound as $TiO_2$ per 100 grams titanyl hydrate as calcined $TiO_2$ to form a titanyl hydrate slurry containing less than about 10 grams/liter free mineral acid;
c. separating the titanyl hydrate from the treated titanyl hydrate slurry containing solubilized impurities;
d. washing the separated titanyl hydrate to remove residual impurities and to produce a purified titanyl; and
e. recovering the purified titanyl hydrate.

In another embodiment of the invention there is provided a process for removing impurities from a titanyl hydrate slurry which comprises:
a. separating the impure titanyl hydrate from a titanyl hydrate slurry to form a titanyl hydrate wet cake and a solution containing soluble impurities;
b. washing the titanyl hydrate wet cake to remove reslusual soluble impurities;
c. reslurrying the titanyl hydrate wet cake with a sufficient amount of water to prepare a titanyl hydrate slurry containing between about 25% and about 45% by weight titanyl hydrate;
d. treating the reslurried titanyl hydrate slurry to solubilize impurities from the titanyl hydrate by the addition of a trivalent titanium compound in an amount between about 0.01 grams and about 0.7 grams trivalent titanium compound as $TiO_2$ per 100 grams titanyl hydrate as calcined $TiO_2$ to form a hydrate slurry containing less than about 10 grams/liter free sulfuric acid;
e. separating the titanyl hydrate from the treated hydrate slurry containing solubilized impurities;
f. washing the separated titanyl hydrate to remove residual solubilized impurities and to produce a purified titanyl hydrate; and
g. recovering the purified titanyl hydrate.

The drawing depicts an embodiment of the inventive process for removing impurities from a slurry of titanyl hydrate.

In preparing titanium dioxide pigment, the titaniferous bearing material containing both soluble and insoluble impurities is digested with a mineral acid to form the titanyl sulfate and iron salts of the mineral acid. By mineral acid is meant either sulfuric or hydrochloric acid. Depending on the concentration of the mineral acid, the titanyl and iron salts of the mineral acid may be soluble in the resulting solution or form a solid mass. If a solid mass is formed, the titanyl and iron salts must be solubilized before further processing. The solution of titanyl and iron mineral acid salt is normally clarified to remove most of the insoluble material and then hydrolyzed to produce a solid titanyl hydrate and an iron mineral acid salt solution which contains soluble impurities. The titanyl hydrate is then separated from the iron mineral acid salt solution by conventional liquid-solid separation techniques. The method for performing the digestion, clarification and hydrolysis procedures are well known in the art and do not constitute a part of this invention.

Following this initial separation to remove excess solution containing the soluble impurities from the separated solid titanyl hydrate, the titanyl hydrate cake is washed with water to remove residual soluble impurities. Washing may be performed with clear or acidified water on the equipment used for separation of the titanyl hydrate. However, even after copious washing, the titanium hydrate contains small amounts of impurities; predominantly iron, with minor amounts of magnesium, lead, nickel, vanadium and chromium being present.

Once separated and washed, the titanyl hydrate is slurried with a sufficient amount of water to form a fluid titanyl hydrate slurry. The slurry should be capable of being handled by conventional fluid transfer equipment. A handleable slurry will generally contain between about 25% and about 45% by weight titanyl hydrate. Slurries containing titanyl hydrate above about 45% by weight are difficult to handle by conventional means and are not preferred. Slurries containing titanyl hydrate lower than about 25% by weight are not preferred in view of the excess amount of water present which adversely affects the bleaching operation by limiting the adsorbtion of the trivalent titanium compound onto the titanyl hydrate. Once the slurry is prepared it is treated with a trivalent titanium compound to solubilize the residual impurities. The trivalent titanium compound is preferably selected from the group consisting of titanous sulfate and titanous chloride, although some trivalent organic titanium compounds provide similar results.

The salient feature of the inventive process resides in the discovery that the impurities adsorbed by titanyl hydrate may be removed by the addition of extraordinarily small amounts of a trivalent titanium compound to a titanyl hydrate slurry in the substantial absence of free mineral acid having a sufficiently high concentration of titanyl hydrate, thus eliminating the need for excessive quantities of titanous sulfate.

While the exact mechanism for the performance of the inventive process is not known, it appears as though the impurities are adsorbed by the titanyl hydrate during hydrolysis at active sites on the surface of the hydrate crystal and that the impurities, particularly iron, are removed by an exchange mechanism wherein the trivalent titanium from the treating solution displaces and solubilizes the impurities from the titanyl hydrate sites. The solubilized impurities can then be removed by washing the treated titanyl hydrate with water. In the exchange mechanism, trivalent titanium appears to be adsorbed from the trivalent titanium compound solution until the active sites on the hydrate are occupied. After the active sites are occupied, no more trivalent titanium is adsorbed and any excess trivalent titanium in solution freely passes over the titanyl hydrate surface into the filtrate. The adsorption of trivalent titanium on the hydrate is evident by the irridescent blue color of the titanyl hydrate after treatment with trivalent titanium compound.

It has been unexpectedly discovered that the adsorption of trivalent titanium is inversely related to the free mineral acid concentration and directly related to the concentration of the titanyl hydrate in the repulped titanyl hydrate slurry. Generally, as the concentration of free mineral acid increases, the adsorption of trivalent titanium decreases and as the concentration of titanyl hydrate in the repulped titanyl hydrate slurry increases, the selective adsorption of trivalent titanium increases.

Free acid inhibits the adsorption of trivalent titanium from the trivalent titanium solution onto the titanyl hydrate during the trivalent titanium treatment. The presence of free acid in excess of about 10 grams/liter in the treated titanyl hydrate slurry will limit the efficiency of the trivalent titanium treatment. It is preferred to operate at a free sulfuric acid concentration during the treatment of the slurried titanyl hydrate of less than about 10 grams/liter, more preferably at a concentration of less than about 3 grams/liter, and most preferably at a concentration of less than about 1 gram/liter. Not only does the presence of free acid inhibit the adsorption of trivalent titanium, but it also solubilizes valuable titanium values which are lost in the filtrate after solid-liquid separation by conversion of the titanyl hydrate to a soluble titanyl salt compound.

The concentration of free mineral acid in the trivalent titanium treatment is controlled by limiting the amount of free acid in the washed titanyl hydrate. When solutions of trivalent titanium are used to treat the repulped hydrate slurry, the free acid content of trivalent titanium solution should be controlled to prevent the presence of excess free acid during the trivalent titanium treatment.

The concentration of titanyl hydrate in the titanyl hydrate slurry directly increases the efficiency of the trivalent titanium due to the increased surface area per unit volume of titanyl hydrate with which the trivalent titanium contacts. Generally, the titanyl hydrate is slurried with an amount of water just sufficient to form a slurry capable of being handled by conventional fluid transfer equipment. A titanyl hydrate concentration in the repulped titanyl hydrate of between about 25% and about 45% by weight is preferred, with the most preferred hydrate concentration being between about 30% and about 33% by weight.

In contrast, when the titanyl hydrate is treated with trivalent titanium in the bleaching step as a filter cake or structured matrix, i.e., at a very high % solids by weight, the efficiency of the trivalent titanium adsorption is retarded. It is believed this occurs either by a desorption-readsorption effect, i.e., where the impurities are desorbed by the trivalent titanium only to be readsorbed upon contact with untreated titanyl hydrate further on in the structure, and by a selective or limited flow through the cake or matrix which prevents an even distribution of the trivalent titanium in solution, as well as possibly by a short-circuited flow through the cake or matrix due to cracks in the cake. A combination of these effects may also occur.

The limited or selective and short circuited flows are caused by solid-liquid separation techniques, e.g. vacuum or pressure filtration. If a cake is formed under uneven pressure or compression, the cake will be more porous in those areas subjected to the least pressure. Excessive amounts of trivalent titanium will be needed in order to penetrate the less porous areas, otherwise segregated areas of high impurity content will occur.

By controlling the concentration of free mineral acid and titanyl hydrate in the repulped titanyl hydrate slurry the loss of titanium values can be minimized. This is due to the efficient adsorption of trivalent titanium on the hydrate and the very limited solubilization of the titanyl hydrate by the free acid. It has been unexpectedly found that between about 0.01 grams and about 0.7 grams trivalent titanium as $TiO_2$, preferably between about 0.02 grams and about 0.25 grams trivalent titanium as $TiO_2$, and most preferably between about 0.05 grams and about 0.1 grams trivalent titanium as $TiO_2$ per 100 grams titanyl hydrate as calcined $TiO_2$ is sufficient to solubilize the adsorbed impurities if the free acid and titanyl hydrate concentration in the repulp slurry are properly controlled.

Additionally, it has been found that when the proper bleach treating conditions are employed a trivalent titanium solution prepared from a clarified black liquor solution may be used. A black liquor solution is any titanyl mineral acid salt solution taken from a stage in a process for the production of titanium dioxide prior to precipitation of titanyl hydrate. When employing the conventional titanium dioxide sulfate process, it is preferred to use reaction solution obtained immediately after crystallization and removal of ferrous sulfate heptahydrate.

When making the trivalent titanium solution in a titanium dioxide sulfate process, the solution is typically made by diluting the clarified black liquor solution with water and sulfuric acid and then reducing the solution with a metal reductant, such as iron, zinc, or aluminum. It has been found that under certain conditions when aluminum metal is used as a reductant for titanyl sulfate reduction, efficiencies may exceed 90%. Under general commercial practice, iron is used as the reductant and reduction efficiencies of about 50% or less are typical. The aluminum reduction efficiency is sensitive to the amount of sulfuric acid present during the reduction reaction. In order to obtain a high reduction efficiency with the aluminum reductant, the trivalent titanium solution used in the reduction should preferably have a ratio of titanyl sulfate (measured as $TiO_2$) to total sulfuric acid, i.e., free acid plus active acid, greater than 3.4 and a titanyl sulfate content (measured as $TiO_2$) of about 70 grams/liter. The temperature of the reduction mixture preferably should be held between 30° C. and 90° C., depending upon the titanous sulfate concentration.

The preparation of trivalent titanium solution as the bleaching solution from solutions taken from earlier stages in the manufacturing process provides substantial raw material and cost savings. Since the titanium values are already soluble as a titanyl mineral acid salt, it is not necessary to reprocess titanyl hydrate to prepare the trivalent titanium mineral acid salt as performed by the prior art. Furthermore, mineral acid values are saved because additional acid is not needed for digestion of the titanyl hydrate.

In a titanium dioxide sulfate process, the black liquor solution after clarification may contain titanyl sulfate (measured as $TiO_2$) in the range between about 90 grams/liter and 250 about grams/liter, iron as ferrous sulfate at less than 280 parts per 100 parts titanyl sulfate (measured as $TiO_2$), and sulfuric acid at a ratio of sulfuric acid to titanyl sulfate (measured as $TiO_2$) between about 1.7 and about 2.2. The titanous sulfate solutions used for treating the repulped hydrate slurry should have a total soluble titanium contant (measured as $TiO_2$) between about 30 grams/liter and about 85 grams/liter a ratio of ferrous sulfate to total soluble titanium (measured as $TiO_2$) of between about 0.05:1.2 and about 1.2:1, a titanous sulfate content (measured as $TiO_2$) of between about 30 grams/liter and about 80 grams/liter, and a ratio of sulfuric acid to total soluble titanium (measured as $TiO_2$) of between about 3.4:1 and about 7.0:1. The titanous sulfate solution should preferably have a total soluble titanium content (measured as $TiO_2$) between about 50 grams/liter and about 80 grams/liter, a ratio of ferrous sulfate to total soluble titanium (measured as $TiO_2$) of between about 0.6 to 0.7:1.2, a titanous sulfate content (measured as $TiO_2$) of between about 50 grams/liter and about 75 grams/liter, and a ratio of sulfuric acid to total soluble titanium (measured as $TiO_2$) of between about 5:1 and about 7:1.

The process of the present invention is further illustrated by the accompanying Figure which depicts a preferred embodiment of the process. In the figure, an unpurified titanyl hydrate suspension is fed to solid-liquid separator 2. The solid-liquid separator may be, for example, a vacuum filter or a pressure filter. After separation, the titanyl hydrate wet cake is washed on the separator with water.

After washing, the hydrate wet cake is transferred to repulp tank 4. The wet cake is mixed with an amount of water just sufficient to form a fluid slurry. When the hydrate wet cake has been reslurried, the slurry is treated with an amount of trivalent titanium solution equal to between about 0.01 grams and about 0.70 grams trivalent titanium as $TiO_2$ per 100 grams titanyl hydrate as calcined $TiO_2$ in repulp tank 4.

The treated titanyl hydrate slurry is transferred to solid-liquid separator 6. The solid-liquid separator may be, for example, a rotary vacuum filter or a pressure filter. After separation, the titanyl hydrate wet cake is washed on the separator with water.

While the process has generally been described with regard to the sulfate process for making titanium dioxide, the process may readily be applied to use with a hydrogen chloride titanium dioxide process.

The principle and practice of the present invention is illustrated in the following examples which are exemplary only and it is not intended that the invention be limited thereto since modifications in technique and operation will be apparent to anyone skilled in the art.

Examples 1 to 6 are presented to show the adsorption of the titanous sulfate and the effectiveness of removing impurities by using the inventive process. Example 1 is a blank run, while examples 2 to 6 illustrate the inventive process. The titanous sulfate solution employed in these examples was made from a clarified black liquor solution resulting from the digestion of McIntyre ilmenite.

EXAMPLE 1

1000 g. of washed titanyl hydrate, the equivalent of about 335 g. titanyl hydrate as calcined $TiO_2$, was repulped with 300 ml. of water to form a fluid hydrate slurry. The slurry was deliquored in a 15 cm. Buechner funnel and washed with 1500 ml. of water. The recovered hydrate was calcined at 900° C. and then analyzed. Analyses of the calcinated hydrate are presented in Table I.

EXAMPLE 2

1000 g. of washed titanyl hydrate, the equivalent of about 335 g. titanyl hydrate as calcined $TiO_2$, was repulped with 300 ml. of water to form a fluid hydrate slurry. The slurry was treated with 1 ml. of a solution containing 75 g./l. titanous sulfate solution made from a titanyl sulfate solution recovered after removing ferrous sulfate but prior to hydrolysis, deliquored in a 15 cm. Buechner funnel, and then washed with 1500 ml. of water. The amount of titanous sulfate added was equivalent to 0.024 g. as $TiO_2$ per 100 g. titanyl hydrate as calcined $TiO_2$. The recovered hydrate was calcined at 900° C. and then analyzed. Analyses of the calcined hydrate and bleach filtrate are presented in Table I.

EXAMPLE 3

1000 g. of washed titanyl hydrate, the equivalent of about 335 g. titanyl hydrate as calcined $TiO_2$, was repulped with 300 ml. of water to form a fluid hydrate slurry. The slurry was treated with 2 ml. of a solution containing 75 g./l. titanous sulfate solution made from a titanyl sulfate solution recovered after removing ferrous sulfate but prior to hydrolysis, deliquored in a 15 cm. Buechner funnel, and then washed with 1500 ml. of water. The amount of titanous sulfate added was equivalent to 0.048 g. as $TiO_2$ per 100 g. titanyl hydrate as calcined $TiO_2$. The recovered hydrate was calcined at 900° C. and then analyzed. Analyses of the calcined hydrate and bleach filtrate are presented in Table I.

EXAMPLE 4

1000 g. of washed titanyl hydrate, the equivalent of about 335 g. titanyl hydrate as calcined $TiO_2$, was repulped with 300 ml. of water to form a fluid hydrate slurry. The slurry was treated with 3 ml. of a solution containing 75 g./l. titanous sulfate solution made from a titanyl sulfate solution recovered after removing ferrous sulfate but prior to hydrolysis, deliquored in a 15 cm. Buechner funnel, and then washed with 1500 ml. of water. The amount of titanous sulfate added was equivalent to 0.072 g. as $TiO_2$ per 100 g. titanyl hydrate as calcined $TiO_2$. The recovered hydrate was calcined at 900° C. and then analyzed. Analyses of the calcined hydrate and bleach filtrate are presented in Table I.

EXAMPLE 5

1000 g. of washed titanyl hydrate, the equivalent of about 335 g. titanyl hydrate as calcined $TiO_2$, was repulped with 300 ml. of water to form a fluid hydrate slurry. The slurry was treated with 4 ml. of a solution containing 75 g./l. titanous sulfate solution made from a titanyl sulfate solution recovered after removing ferrous sulfate but prior to hydrolysis, deliquored in a 15 cm. Buechner funnel, and then washed with 1500 ml. of water. The amount of titanous sulfate added was equivalent to 0.096 g. as $TiO_2$ per 100 g. titanyl hydrate as calcined $TiO_2$. The recovered hydrate was calcined at 900° C. and then analyzed. Analyses of the calcined hydrate and bleach filtrate are presented in Table I.

EXAMPLE 6

1000 g. of washed titanyl hydrate, the equivalent of about 335 g. titanyl hydrate as calcined $TiO_2$, was repulped with 300 ml. of water to form a fluid hydrate slurry. The slurry was treated with 5 ml. of a solution containing 75 g./l. titanous sulfate solution made from a titanyl sulfate solution recovered after removing ferrous sulfate but prior to hydrolysis, deliquored in a 15 cm. Buechner funnel, and then washed with 1500 ml. of water. The amount of titanous sulfate added was equivalent to 0.119 g. as $TiO_2$ per 100 g. titanyl hydrate as calcined $TiO_2$. The recovered hydrate was calcined at 900° C. and then analyzed. Analyses of the calcined hydrate and bleach filtrate are presented in Table I.

Examples 7 to 12 are presented to compare the effectiveness of removing impurities by washing the titanous sulfate solution through a titanyl hydrate wet cake with the inventive process. Examples 7 and 8 are a blank run and the inventive process, respectively. Examples 9 to 12 are comparative examples.

EXAMPLE 7

1000 g. of washed titanyl hydrate, the equivalent of about 335 g. titanyl hydrate as calcined $TiO_2$, was repulped with 300 ml. of water to form a fluid hydrate slurry. The slurry was deliquored in a 15 cm. Buechner funnel and washed with 1600 ml. of water. The recovered hydrate was calcined at 900° C. and then analyzed. Analyses of the calcined hydrate are presented in Table II.

EXAMPLE 8

1000 g. of washed titanyl hydrate, the equivalent of about 335 g. titanyl hydrate as calcined $TiO_2$, was repulped with 300 ml. of water to form a fluid hydrate slurry. The slurry was treated with 5 ml. of a solution containing 59.2 g./l. deliquored in a 15 cm. Buechner funnel, and then washed with 1500 ml. of water. The titanous sulfate solution recovered after removing ferrous sulfate but prior to hydrolysis. The recovered hydrate was calcined at 900° C. and then analyzed. Analyses of the calcined hydrate and bleach filtrate are presented in Table II.

EXAMPLE 9

1000 g. of wash titanyl hydrate, the equivalent of about 335 g. titanyl hydrate as calcined $TiO_2$, was repulped with 300 ml. of water to form a fluid hydrate slurry. The hydrate slurry was deliquored in a 15 cm. Buechner funnel to form a substantially crack-free filter cake. The filter cake was treated with a mixture of 300 ml. of water and 5 ml. of a solution containing 59.2 g./l. titanous sulfate solution and deliquored. The titanous sulfate solution was made from a titanyl sulfate solution, recovered after removing ferrous sulfate but prior to hydrolysis. The treated cake was then washed with 1600 ml. of water. The recovered hydrate was calcined at 900° C. and then analyzed. Analyses of the calcined hydrate and bleach filtrate are presented in Table II.

EXAMPLE 10

1000 g. of wash titanyl hydrate, the equivalent of about 335 g. titanyl hydrate as calcined $TiO_2$, was repulped with 300 ml. of water to form a fluid hydrate slurry. The hydrate slurry was deliquored in a 15 cm. Buechner funnel to form a substantially crack-free filter cake. The filter cake was treated with a mixture of 300 ml. of water and 10 ml of a solution containing 59.2 g./l. titanous sulfate solution and deliquored. The titanous sulfate solution was made from a titanyl sulfate solution, recovered after removing ferrous sulfate but prior to hydrolysis. The treated cake was then washed with 1600 ml. of water. The recovered hydrate was calcined at 900° C. and then analyzed. Analyses of the calcined hydrate and bleach filtrate are presented in Table II.

EXAMPLE 11

1000 g. of wash titanyl hydrate, the equivalent of about 335 g. titanyl hydrate as calcined $TiO_2$, was repulped with 300 ml. of water to form a fluid hydrate slurry. The hydrate slurry was deliquored in a 15 cm. Buechner funnel to form a substantially crack-free filter cake. The filter cake was treated with a mixture of 300 ml. of water and 15 ml. of a solution containing 59.2 g./l. titanous sulfate solution and deliquored. The titanous sulfate solution was made from a titanyl sulfate solution, recovered after removing ferrous sulfate but prior to hydrolysis. The treated cake was then washed with 1600 ml. of water. The recovered hydrate was calcined at 900° C. and then analyzed. Analyses of the calcined hydrate and bleach filtrate are presented in Table II.

EXAMPLE 12

1000 g. of wash titanyl hydrate, the equivalent of about 335 g. titanyl hydrate as calcined $TiO_2$, was repulped with 300 ml. of water to form a fluid hydrate slurry. The hydrate slurry was deliquored in a 15 cm. Buechner funnel to form a substantially crack-free filter cake. The filter cake was treated with a mixture of 300 ml. of water and 20 ml. of a solution containing 59.2 g./l. titanous sulfate solution and deliquored. The titanous sulfate solution was made from a titanyl sulfate solution, recovered after removing ferrous sulfate but prior to hydrolysis. The treated cake was then washed with 1600 ml of water. The recovered hydrate was calcined at 900° C. and then analyzed. Analyses of the calcined hydrate and bleach filtrate are presented in Table III.

Examples 13–18 are presented to show the effect of acid concentration on titanous sulfate adsorption and titanium solubility during the inventive bleaching process. Example 13 illustrates a commercial bleaching operation. Examples 14 and 15 illustrate the inventive process. Examples 16 to 18 are comparative examples. The titanous sulfate solution employed in these examples was made from Q.I.T. furnace slag.

EXAMPLE 13

1000 g. of washed titanyl hydrate, the equivalent of about 335 g. titanyl hydrate as $TiO_2$, was repulped with 610 ml. of water and 80 ml. concentrated $H_2SO_4$ to form a fluid hydrate slurry containing 100 g./l. $H_2SO_4$. Then 0.2 g. of powdered aluminum was added to the hydrate slurry and reacted at between about 60° C. and 80° C. for one-half hour. It was then deliquored in a 15 cm. Buechner funnel and washed with 1400 ml. of water. Analyses of the bleach filtrate and wash filtrate are presented in Table III.

EXAMPLE 14

1000 g. of washed titanyl hydrate, the equivalent of about 335 g. titanyl hydrate as $TiO_2$, was repulped with 350 ml. of water and to form a fluid hydrate slurry. The slurry was treated with 5 ml. of a 70 g./l. titanous sulfate solution, deliquored in a 15 cm. Buechner funnel, and then washed with 1500 ml. of water. Analyses of the bleach filtrate and wash filtrate are presented in Table III.

EXAMPLE 15

1000 g. of washed titanyl hydrate, the equivalent of about 335 g. titanyl hydrate as calcined $TiO_2$, was repulped with 350 ml. of water and 6 ml. concentrated $H_2SO_4$ to form a fluid hydrate slurry containing 10 g./l. $H_2SO_4$. The slurry was treated with 5 ml. of a 70 g./l. titanous sulfate solution, deliquored in a 15 cm. Buechner funnel, and then washed with 1500 ml. of water. Analyses of the bleach filtrate and wash filtrate are presented in Table III.

EXAMPLE 16

1000 g. of washed titanyl hydrate, the equivalent of about 335 g. titanyl hydrate as calcined $TiO_2$, was repulped with 350 ml. of water and 12 ml. concentrated $H_2SO_4$ to form a fluid hydrate slurry containing 20 g./l. $H_2SO_4$. The slurry was treated with 5 ml. of a 70 g./l. titanous sulfate solution, deliquored in a 15 cm. Buechner funnel, and then washed with 1500 ml. of water. Analyses of the bleach filtrate and wash filtrate are presented in Table III.

EXAMPLE 17

1000 g. of washed titanyl hydrate, the equivalent of about 335 g. titanyl hydrate as calcined $TiO_2$, was repulped with 350 ml. of water and 24 ml. concentrated $H_2SO_4$ to form a fluid hydrate slurry containing 40 g./l. $H_2SO_4$. The slurry was treated with 5 ml. of a 70 g./l. titanous sulfate solution, deliquored in a 15 cm. Buechner solution, recovered after removing ferrous sulfate but prior to hydrolysis. The treated cake was then washed with 1600 ml of water. The recovered hydrate was calcined at 900° C. and then analyzed. Analyses of the calcined hydrate and bleck filtrate are presented in Table III.

EXAMPLE 18

1000 g. of washed titanyl hydrate, the equivalent of about 335 g. titanyl hydrate as calcined $TiO_2$, was repulped with 350 ml. of water and 48 ml. concentrated $H_2SO_4$ to form a fluid hydrate slurry containing 80 g./l. $H_2SO_4$. The slurry was treated with 5 ml. of a 70 g./l. titanous sulfate solution, deliquored in a 15 cm. Buechner funnel, and then washed with 1500 ml. of water. Analyses of the bleach filtrate and wash filtrate are presented in Table III.

The invention being thus described, it will be obvious that the same may be varied in many ways, such variations are not to be regarded as a departure from the spirit and scope of the invention, and all such modifications are intended to be within the scope of the following claims.

TABLE I

| Example | ml. of $Ti^{3+}$ Soln. | Grams $TiO_2$ Added | Hydrate Impurity Analyses (PPM) Fe | Mg | Cu | Mn | V | Cr | Bleach Filtrate Analyses g./l. $Ti^{3+}$ | g./l. $H_2SO_4$ | g./l. Fe as $Fe_2O_3$ | g./l. Total $TiO_2$ |
|---|---|---|---|---|---|---|---|---|---|---|---|---|
| 1[a] | 0 | 0 | >180 | 34 | 1.0 | 2.15 | 7.5 | 2.3 | 0.0 | — | — | — |
| 2[b] | 1 | 0.0907 | 30 | 7 | 1 | 0 | 6 | 1.6 | 0.0 | 1.0 | 0.15 | 0.0063 |
| 3[b] | 2 | 0.1814 | 14 | 9 | 1 | 0 | 5 | 1.1 | 0.0 | 1.25 | 0.15 | 0.007 |
| 4[b] | 3 | 0.2721 | 9 | 5 | 1 | 0 | 4 | 0.8 | 0.0 | 1.15 | 0.25 | 0.005 |
| 5[b] | 4 | 0.3628 | 15 | 3 | 1 | 0 | 10 | 2.7 | 0.0 | 1.33 | 0.25 | 0.005 |
| 6[b] | 5 | 0.4535 | 8 | 4 | 1 | 0 | 7 | 1.8 | 0.0 | 1.50 | 0.27 | 0.015 |

[a]denotes an untreated comparative example.
[b]denotes inventive example

TABLE II

| Example | ml. of $Ti^{3+}$ Soln. | Hydrate Impurity Analyses (PPM) Fe | Sb | Cu | Mn | V | Cr | Bleach Filtrate Analyses g./l. $Ti^{3+}$ | g./l. $H_2SO_4$ | g./l. $Fe_2O_3$ | g./l. Fe as Total $TiO_2$ |
|---|---|---|---|---|---|---|---|---|---|---|---|
| 7[a] | 0 | 186 | 11 | 1 | 0.9 | 8 | 2.1 | — | — | — | — |
| 8[b] | 5 | 25 | 2 | 1 | 0 | 10 | 2.5 | 0.001 | 1.35 | 0.14 | 0.0039 |
| 9[c] | 5 | 106 | 11 | 1 | 0 | 9 | 2.9 | 0 | 1.1 | 0.104 | 0.0039 |
| 10[c] | 10 | 31 | 6 | 1 | 0 | 10 | 2.5 | 0 | 1.88 | 0.20 | 0.0077 |
| 11[c] | 15 | 90 | 6 | 1 | 0 | 8 | 4.4 | 0.134 | 3.02 | 0.45 | 0.1962 |
| 12[c] | 20 | 24 | 9 | 1 | 0 | 10 | 2.4 | 0.266 | 3.6 | 0.45 | 0.3269 |

[a]denotes an untreated comparative example.
[b]denotes inventive example
[c]denotes comparative example

TABLE III

| Examples | Bleach Filtrate g./l. $H_2SO_4$ | g./l. $Ti^{3+}$ | g./l. Total $TiO_2$ | g./l. Total $Fe_2O_3$ | g./l. $H_2SO_4$ | Wash Filtrate g./l. $Fe_2O_3$ |
|---|---|---|---|---|---|---|
| 13[a] | 100 | 0.44 | 1.23 | 0.13 | 104 | 0.006 |
| 14[b] | 0 | 0.00 | 0.02 | 0.20 | 1.5 | 0.006 |
| 15[b] | 10 | 0.04 | 0.17 | 0.17 | 1.0 | 0.006 |
| 16[c] | 20 | 0.04 | 0.26 | 0.19 | 19 | 0.006 |
| 17[c] | 40 | 0.10 | 0.525 | 0.21 | 39 | 0.006 |
| 18[c] | 80 | 0.14 | 1.13 | 0.21 | 76 | 0.006 |

[a]denotes commercial bleach example
[b]denotes inventive example
[c]denotes comparative example

We claim:
1. A process for removing impurities from titanyl hydrate comprising:
   a. slurrying an impure titanyl hydrate with a sufficient amount of water to prepare a titanyl hydrate slurry containing between about 25% and about 45% by weight titanyl hydrate;

b. treating the titanyl hydrate slurry to solubilize impurities from the titanyl hydrate by the addition of a trivalent titanium compound in an amount between about 0.01 grams and about 0.7 grams trivalent titanium compound as $TiO_2$ per 100 grams titanyl hydrate as calcined $TiO_2$ to form a titanyl hydrate slurry containing less than about 10 grams/liter free mineral acid;

c. separating the titanyl hydrate from the treated titanyl hydrate slurry containing solubilized impurities;

d. washing the separated titanyl hydrate to remove residual impurities and to produce a purified titanyl hydrate; and e. recovering the purified titanyl hydrate.

2. The process of claim 1 wherein the trivalent titanium compound is selected from the group consisting of titanous sulfate and titanous chloride.

3. The process of claim 1 wherein the titanyl hydrate slurry contains between about 30% and about 33% by weight titanyl hydrate.

4. The process of claim 1 wherein the trivalent titanium compound is dissolved in a clarified black liquor solution.

5. The process of claim 4 wherein the clarified black liquor solution contains titanyl sulfate (measured as $TiO_2$) in the range between about 90 grams/liter and about 250 grams/liter, iron (measured as ferrous sulfate) at less than about 280 parts per 100 parts titanyl sulfate (measured as $TiO_2$), and sulfuric acid at a weight ratio of sulfuric acid to titanyl sulfate (measured as $TiO_2$) in an amount of between about 1.7 and 2.2.

6. The process of claim 1 wherein the trivalent titanium compound is titanous sulfate dissolved in a solution containing a total soluble titanium content (measured as $TiO_2$) of between about 30 grams/liter and about 85 grams/liter, a ratio of ferrous sulfate to total soluble titanium (measured as $TiO_2$) of between about 0.05:1.2 and about 1.2:1, a titanous sulfate content (measured as $TiO_2$) of between about 30 grams/liter and about 80 grams/liter, and a ratio of sulfuric acid to total soluble titanium (measured as $TiO_2$) of between about 3.4:1 and about 7.0:1.

7. The process of claim 1 wherein the trivalent titanium compound is titanous sulfate dissolved in a solution containing a total soluble titanium (measured as $TiO_2$) of between about 50 grams/liter and about 80 grams/liter, a ratio of ferrous sulfate to total soluble titanium (measured as $TiO_2$) of between about 0.6 to 0.7:1.2, a titanous sulfate content (measured as $TiO_2$) of between about 50 grams/liter and about 75 grams/liter, and a ratio of sulfuric acid to total soluble titanium (measured as $TiO_2$) of between about 5:1 and about 7:1.

8. The process of claim 1 wherein the trivalent titanium compound is titanous sulfate which is added in an amount between about 0.05 grams and about 0.25 grams titanous sulfate as $TiO_2$ per 100 grams titanyl hydrate as calcined $TiO_2$.

9. The process of claim 1 wherein the repulped hydrate slurry contains less than about 3 grams/liter free sulfuric acid after the addition of the trivalent titanium compound.

10. A process for removing impurities from a titanyl hydrate slurry which comprises:

a. separating the impure titanyl hydrate from a titanyl hydrate slurry to form a titanyl hydrate wet cake and a solution containing soluble impurities;

b. washing the titanyl hydrate wet cake to remove soluble impurities;

c. reslurrying the titanyl hydrate wet cake with a sufficient amount of water to prepare a titanyl hydrate slurry containing between about 25% and about 45% by weight titanyl hydrate slurry;

d. treating the reslurried titanyl hydrate slurry to solubilize impurities from the titanyl hydrate by the addition of a trivalent titanium compound in an amount between about 0.01 grams and about 0.7 grams trivalent titanium compound as $TiO_2$ per 100 grams titanyl hydrate as calcined $TiO_2$ to form a titanyl hydrate slurry containing less than about 10 grams/liter free sulfuric acid;

e. separating the titanyl hydrate from the treated titanyl hydrate slurry containing solubilized impurities;

f. washing the separated titanyl hydrate with water to remove residual impurities and to produce a purified titanyl hydrate; and g. recovering the purified titanyl hydrate.

11. The process of claim 10 wherein the trivalent titanium compound is selected from the group consisting of titanous sulfate and titanous chloride.

12. The process of claim 10 wherein the titanyl hydrate slurry contains between about 30% and about 33% by weight titanyl hydrate.

13. The process of claim 10 wherein the trivalent titanium compound is dissolved in a clarified black liquor solution.

14. The process of claim 13 wherein the clarified black liquor solution contains titanyl sulfate (measured as $TiO_2$) in the range between about 90 grams/liter and about 250 grams/liter, iron (measured as ferrous sulfate) at less than about 280 parts per 100 parts titanyl sulfate (measured as $TiO_2$), and sulfuric acid at a weight ratio of sulfuric acid to titanyl sulfate (measured as $TiO_2$) in an amount of between about 1.7 and 2.2.

15. The process of claim 10 wherein the trivalent titanium compound is titanous sulfate dissolved in a solution containing a total soluble titanium content (measured as $TiO_2$) of between about 30 grams/liter and about 85 grams/liter, a ratio of ferrous sulfate to total soluble titanium (measured as $TiO_2$) of between about 0.05:1.2 and about 1.2:1, a titanous sulfate content (measured as $TiO_2$) of between about 30 grams/liter and about 80 grams/liter, and a ratio of sulfuric acid to total soluble titanium (measured as $TiO_2$) of between about 3.4:1 and about 7.0:1.

16. A process for removing impurities from a titanyl hydrate slurry which comprises:

a. separating the impure titanyl hydrate from a titanyl hydrate slurry to form a titanyl hydrate wet cake and a solution containing soluble impurities;

b. washing the titanyl hydrate wet cake to remove soluble impurities;

c. reslurrying the titanyl hydrate wet cake with a sufficient amount of water to make a titanyl hydrate slurry containing between about 30% and about 33% by weight titanyl hydrate;

d. treating the titanyl hydrate slurry to solubilize impurities from the titanyl hydrate by the addition of titanous sulfate dissolved in a black liquor solution derived from a stage in a process for producing titanium dioxide prior to the precipitation of titanyl hydrate in an amount between about 0.05 grams and about 0.25 grams titanous sulfate as $TiO_2$ per 100 grams titanyl hydrate as cancined $TiO_2$ to form a titanyl hydrate slurry containing less than about 1 gram/liter free sulfuric acid;

e. separating the titanyl hydrate from the treated titanyl hydrate slurry;

f. washing the separated titanyl hydrate with water to remove residual impurities and to produce a purified titanyl hydrate; and g. recovering the purified titanyl hydrate.

* * * * *